(12) United States Patent
Sato

(10) Patent No.: US 7,416,122 B2
(45) Date of Patent: Aug. 26, 2008

(54) PRODUCT IDENTIFICATION DATA MANAGEMENT SYSTEM AND PRODUCT IDENTIFICATION DATA MANAGEMENT METHOD

(75) Inventor: Tadashi Sato, Tokyo (JP)

(73) Assignee: NEC Corporation, Minato-Ku, Tokyo (JP)

( * ) Notice: Subject to any disclaimer, the term of this patent is extended or adjusted under 35 U.S.C. 154(b) by 207 days.

(21) Appl. No.: 11/022,263

(22) Filed: Dec. 23, 2004

(65) Prior Publication Data

US 2005/0139665 A1  Jun. 30, 2005

(30) Foreign Application Priority Data

Dec. 24, 2003  (JP) .............................. 2003-428416

(51) Int. Cl.
*G06K 13/67* (2006.01)

(52) U.S. Cl. ..................................... 235/385; 235/383

(58) Field of Classification Search ................ 235/385, 235/383, 462.01, 462.46, 472.02
See application file for complete search history.

(56) References Cited

U.S. PATENT DOCUMENTS

| | | | |
|---|---|---|---|
| 5,382,784 A | 1/1995 | Eberhardt | |
| 6,150,942 A * | 11/2000 | O'Brien | 340/573.1 |
| 6,415,978 B1 | 7/2002 | McAllister | |
| 6,429,776 B1 | 8/2002 | Alicot et al. | |
| 7,044,374 B2 * | 5/2006 | Allison et al. | 235/385 |
| 7,084,789 B2 * | 8/2006 | Varanasi et al. | 341/59 |
| 2003/0015585 A1 * | 1/2003 | Wike et al. | 235/383 |
| 2003/0095032 A1 | 5/2003 | Hoshino et al. | |
| 2003/0174099 A1 | 9/2003 | Bauer et al. | |
| 2005/0199723 A1 * | 9/2005 | Lubow | 235/462.01 |

FOREIGN PATENT DOCUMENTS

| | | |
|---|---|---|
| JP | 2000-276477 | 10/2000 |
| JP | 2001-287810 | 10/2001 |
| WO | WO 00/10144 | 2/2000 |
| WO | WO 00/48115 | 8/2000 |

* cited by examiner

*Primary Examiner*—Daniel St.Cyr
(74) *Attorney, Agent, or Firm*—Scully, Scott, Murphy & Presser, P.C.

(57) ABSTRACT

The present invention relates to a product identification data management system and method. According to the present invention, an input device of a purchasing department reads a bar code and an RF tag as data of two identification data systems added to a product such that the identification data of the two identification data systems are related with each other. The read bar code data and RF tag data are stored and managed in first and second databases of a information department, respectively. When a user terminal such as a product data terminal issues a request to acquire predetermined data on the basis of the bar code data of the product, the predetermined data is retrieved from either or both of the first and second databases. The acquired data is returned to the user terminal. The consistency between identification data added to each product can also be checked.

14 Claims, 13 Drawing Sheets

FIG. 5

| BAR CODE | DESCRIPTION | SIZE |
|---|---|---|
| $B_1$ | POTATO CHIPS | L |
| $B_2$ | CHOCOLATE | S |
| $B_3$ | BISCUIT | M |

(RELATING UNIT)

START

EXTRACT CLASS FIELD OF EPC — S201

REQUEST DATA UPDATING UNIT TO WRITE BAR CODE DATA "Bn" AS DATA ITEM "BAR CODE" CORRESPONDING TO EPC WITH EXTRACTED CLASS FIELD "n" — S202

END

FIG. 7

(DATA UPDATING UNIT)

START

WRITE BAR CODE DATA "Bn" AS DATA ITEM "BAR CODE" WHICH CORRESPONDS TO PREDETERMINED EPC — S221

END

115

| EPC | BAR CODE | FACTORY | WAREHOUSE | STORE |
|---|---|---|---|---|
| $A_{1-1}$ | $B_1$ | 2003/10/2 13:24 | 2003/10/4 8:25 | 2003/10/5 6:03 |
| $A_{1-2}$ | $B_1$ | 2003/10/2 13:24 | 2003/10/4 8:25 | 2003/10/5 6:03 |
| $A_{1-3}$ | $B_1$ | 2003/10/2 13:24 | 2003/10/4 8:25 | 2003/10/5 11:10 |
| $A_{2-1}$ | $B_2$ | | | |
| $A_{2-2}$ | $B_2$ | | | |
| $A_{3-1}$ | | | | |
| $A_{3-2}$ | | | | |

FIG. 8

| EPC | DESCRIPTION | SIZE | FACTORY | WAREHOUSE | STORE |
|---|---|---|---|---|---|
| $A_{1-1}$ | POTATO CHIPS | L | 2003/10/2 13:24 | 2003/10/4 8:25 | 2003/10/5 6:03 |
| $A_{1-2}$ | POTATO CHIPS | L | 2003/10/2 13:24 | 2003/10/4 8:25 | 2003/10/5 6:03 |
| $A_{1-3}$ | POTATO CHIPS | L | 2003/10/2 13:24 | 2003/10/4 8:25 | 2003/10/5 11:10 |
| $A_{2-1}$ | | | | | |
| $A_{2-2}$ | | | | | |
| $A_{3-1}$ | | | | | |
| $A_{3-2}$ | | | | | |

| EPC | DESCRIPTION | SIZE | FACTORY | WAREHOUSE | STORE |
|---|---|---|---|---|---|
| $A_{1-1}$ | POTATO CHIPS | L | 2003/10/2 13:24 | 2003/10/4 8:25 | 2003/10/5 6:03 |
| $A_{1-2}$ | POTATO CHIPS | L | 2003/10/2 13:24 | 2003/10/4 8:25 | 2003/10/5 6:03 |
| $A_{1-3}$ | POTATO CHIPS | L | 2003/10/2 13:24 | 2003/10/4 8:25 | 2003/10/5 11:10 |
| $A_{2-1}$ | CHOCOLATE | S | | | |
| $A_{2-2}$ | CHOCOLATE | S | | | |
| $A_{3-1}$ | | | | | |
| $A_{3-2}$ | | | | | |

116

| BAR CODE | EPC |
|---|---|
| $B_1$ | $A_{1-1}$ |
| $B_1$ | $A_{1-2}$ |
| $B_1$ | $A_{1-3}$ |

| BAR CODE | EPC |
|---|---|
| $B_1$ | $A_{1-1}$ |
| $B_1$ | $A_{1-2}$ |
| $B_1$ | $A_{1-3}$ |
| $B_2$ | $A_{2-1}$ |
| $B_2$ | $A_{2-2}$ |

FIG. 21

PRODUCT IDENTIFICATION DATA MANAGEMENT SYSTEM AND PRODUCT IDENTIFICATION DATA MANAGEMENT METHOD

BACKGROUND OF THE INVENTION

1. Field of the Invention

The present invention relates to a product identification data management system and method for managing identification data attached to products.

2. Description of the Related Art

Bar codes are affixed on most products dealt with in stores. A bar code is a combination of varying-width parallel bars and spaces and represents numerical data or symbolic data. The bar code is read using a bar code reader as a dedicated input device, so that data of the corresponding product can be obtained. Therefore, data concerned with each product can be rapidly input with accuracy without using an input device such as a keyboard to manually input data. Accordingly, bar codes are attached to many products and are effectively used.

Typical data represented using a bar code affixed on a product includes, for example, JAN (Japanese Article Number) code. The JAN code consists of 13 or 8 digits. The JAN code includes a country code indicating in what country the corresponding product was produced, a manufacturer code indicating the manufacturer of the product, a product code specifying the product, and a check digit. Advantageously, the quantity of stock and the sale proceeds can be immediately grasped using barcodes affixed on respective products.

When a bar code consists of, e.g., 13 digits, data indicating the product code corresponds to only 5 digits. Unfortunately, detailed information such as the name of the product and its price cannot be obtained from the read JAN code. In the application of bar codes for product management, an approach of using a bar code as ID, i.e., identification data for database retrieval is used. The bar code can include only identification data to specify the corresponding product, so that the number of digits can be reduced. As identification data included in a bar code, for example, a product code, an order number, a delivery number, a drawing number, a manufacturing management number, an operating instruction number, or a serial number is used.

A user uses a bar code reader to scan a bar code attached on a product, thus reading data of the bar code. Accordingly, bar codes are not suitable for checking the quantity of stock of an item after products of the item are arranged in a showcase. Hence, an approach of adding a radio frequency (RF) tag to each product is proposed.

The RF tag is also called an electronic tag (integrated circuit tag; IC tag). Data concerned with a product is read using radio waves generated from the corresponding tag. It is unnecessary to move a tag reader close to a product in order to scan a tag affixed on the product. Advantageously, RF tags are attached to various products such as clothing, food, daily needs, and books. The RF tag can have various capabilities for stock management, sales management, ensuring traceability, theft prevention, and information service. In addition, the RF tag has extremely higher information processing capability than those of already-existing bar code systems. Data can be rewritten or added to the RF tag.

The above-mentioned RF tag is being minimized as a combination of an IC chip and an antenna and its price is being plunged. There are signs of widespread proliferation of RF tags. Japanese Unexamined Patent Application Publication No. 2001-287810 (Reference 1) discloses a technique of affixing an RF tag, called an electronic product code (EPC) to identify each individual product, on each product for product distribution management.

The bar code systems have already been widespread as mentioned above. The application field thereof is not limited to recording codes of various products with registers serving as point-of-sale (POS) terminals at the point of sale to count sold products. For example, data corresponding to respective bar codes are registered in a database so that the bar codes are used for accounting treatment of sold products. Various processes are established in product management using bar codes.

To achieve greater proliferation of RF tags, it is necessary that RF tag systems coexist with the already-existing established bar code systems for the bar code system users' convenience and making the smooth transition to the new systems. For this purpose, for example, both of a bar code and an RF tag are temporarily attached to each product.

Each RF tag has larger data capacity than that of each bar code. Accordingly, RF tag data represented by the RF tag can include bar code data represented by the bar code. When the magnitude relationship between two kinds of data capacities is found, identification data of one identification data system (large-capacity data system) with a large data capacity contains identification data of the other identification data system (small-capacity data system) with a small data capacity, so that the two kinds of identification data can be related with each other.

In the above-mentioned relating, identification data of the small-capacity data system is written in identification data of the large-capacity data system. Regarding the attachment of a tag including identification data of the large-capacity data system to each product, disadvantageously, the tag cannot be attached to the product unless a bar code including identification data of the small-capacity data system has already been attached to the product. In addition, if new identification data of the small-capacity data system is used, it is necessary to form tags including identification data of the large-capacity data system so that the identification data of the large-capacity data system includes the new identification data of the small-capacity data system. In other words, it is necessary to always recognize identification data of the small-capacity data system when the corresponding tag is fabricated. Disadvantageously, the fabrication of tags and the management of identification data are difficult.

To overcome the above disadvantages, a technique of mixing a keyword of one data system, indicating the features of an individual, as an exchangeable keyword into identification data of the other data system is proposed. For example, Japanese Unexamined Patent Application Publication No. 2000-276477 (Reference 2) discloses such a technique.

According to the above technique, since a keyword of one data system indicating the features of an individual is mixed as an exchangeable keyword into identification data of the other data system, keywords can be flexibly set to some extent. However, it is necessary to find a keyword by keyword matching. According to this technique, therefore, it is necessary to generate identification data of one data system in consideration of the other data system. Disadvantageously, the dependence between two data systems cannot be eliminated.

SUMMARY OF THE INVENTION

Accordingly, it is an object of the present invention to provide a product identification data management system and method capable of adding identification data of different data systems to each product independently of each other and also capable of relating the identification data of the two data systems with each other.

According to a first aspect of the present invention, a product identification data management system includes: (a) an identification data input unit for inputting identification data of two data systems added to each product such that the identification data of one data system is related with that of the other data system every product; (b) a database for storing the identification data of the two data systems input by the identification data input unit such that the identification data of one data system is related with that of the other data system every product; and (c) a database retrieval unit for retrieving the Identification data of one data system from the database and acquiring the identification data when the identification data of the other data system is designated.

In other words, according to the first aspect of the present invention, the identification data input unit inputs identification data of two data systems actually added to a product or to be added thereto. The identification data of the two data systems are stored in the database such that they are related with each other every product. Thus, when any of the identification data of the two data systems is designated, the identification data of the designated data system is retrieved from the database, so that the identification data of the other data system can be acquired. In addition, the identification data of the two data systems can be related with each other in the database. Thus, each identification data can be independently operated.

According to a second aspect of the present invention, a product identification data management system includes: (a) a relation mode reading unit for reading identification data of two data systems correctly added to each product in order to identify the same product; (b) a relating unit for relating the class fields of the identification data of the two data systems, read by the relation mode reading unit, with each other every kind of product, the class field serving as a data segment to identify the kind of product; (c) a database for storing the identification data of the two data systems with the class fields related by the relating unit; and (d) a database retrieval unit for retrieving the identification data of one data system from the database and acquiring the identification data when the class field of the identification data of the other data system is designated.

In other words, according to the second aspect of the present invention, the relation mode reading unit reads identification data of two data systems correctly added to each product in order to identify the same product. The identification data of the two data systems can be read simultaneously, successively, or at different times. The relating unit relates the class fields of the identification data of the two data systems with each other every kind of product. The class field serves as a data segment to identify the kind of product. The related identification data of the two data systems are stored in the database. Thus, when the class field of the identification data of any of the two data systems is designated, the identification data of the other data system can be acquired with reference to the database. In addition, the identification data of the two data systems are related with each other in the database. Thus, each identification data can be independently operated.

According to a third aspect of the present invention, a product identification data management system includes: (a) a relation mode reading unit for reading identification data of two data systems correctly added to each product in order to identify the same product; (b) a relating unit for relating the class fields of the identification data of the two data systems, read by the relation mode reading unit, with each other every kind of product, the class field serving as a data segment to identify the kind of product; (c) a database for storing the identification data of the two data systems with the class fields related by the relating unit; (d) a check mode reading unit for reading identification data of the two data systems added to the same product in order to check the unknown relation therebetween; (e) a check mode retrieval unit for retrieving identification data of one data system, which is related with the identification data of the other data system read by the check mode reading unit, from the database; (f) an identification data checking unit for checking whether the identification data retrieved by the check mode retrieval unit is identical to the identification data with the related class field read by the check mode reading unit; and (g) a relation determination unit for determining that the identification data of the two data systems with the unknown relation therebetween added to the product, read by the check mode reading unit, are related with each other as identification data of the same product when the identification data checking unit obtains the consistency of both the identification data, and for determining that the identification data of the two data systems are not related with each other as identification data of the same product in other cases.

In other words, according to the third aspect of the present invention, when identification data of the two data systems are added to each product on condition that the database for storing the related identification data of the two data systems is constructed in a manner similar to the invention disclosed in Claim 2, the consistency therebetween for the same product is checked. To check the consistency therebetween, on the basis of identification data of one data system read from the product to be checked, identification data of the other data system is acquired from the database. Whether the acquired identification data is identical to the identification data read from the product is determined. Thus, after identification data of the two data systems are added to each product, the consistency therebetween can be easily checked.

According to the fourth aspect of the invention, a product identification data management system includes: a first computer-readable recording medium for recording first identification data, the first recording medium being attached to each product to be managed; a second computer-readable recording medium for recording second identification data having a data system independent of that of the first identification data, the second recording medium being attached to each product together with the first recording medium; a first storage device for storing the first identification data and data recorded in connection with the first identification data; a second storage device for storing the first and second identification data such that the first identification data recorded in the first recording medium attached to the product is related with the second identification data recorded in the second recording medium attached to the same product; and a processor for executing a process of retrieving data on the basis of input second identification data by using first identification data corresponding to the input second identification data.

In the fourth aspect, during the transition to a new code system or a new recording medium used to add identification data to a product, e.g., the transition from a bar code to an RF tag, the new code system can be added to the product independently of an old code system. In addition, the new code system can utilize a database constructed in association with the old code system. In this case, the system may further include a third storage device for storing the second identification data and data recorded in connection with the second identification data.

In the fourth aspect, the system may further include a processor for executing a process of checking data stored in the first storage device against data stored in the third storage device on the basis of the relation stored in the second storage device. The first to third storage devices may be the same storage device.

In the system of the fourth aspect, the first recording medium may include a bar code printed matter and the second recording medium may include an RF tag.

As mentioned above, according to the present invention, identification data of two data systems are externally related with each other, the relation therebetween is stored in a database. Accordingly, identification data of one data system need not include all or a part of identification data of the other data system. Since identification data of the two data systems need not depend on each other, the identification data of the two data systems can be independently managed. In addition, identification data itself need not include excess information, thus resulting in efficient data structure.

BRIEF DESCRIPTION OF THE DRAWINGS

FIG. 5 is a table explaining the content of a second database according to the first embodiment;

FIG. 6 is a flowchart of a process of a relating unit according to the first embodiment;

FIG. 7 is a flowchart of a process of a data updating unit in response to a request in step S202;

FIG. 8 is a table explaining the content of the first database after a processing step in S221 is performed;

FIG. 20 is a table partially showing data stored in a second database according to the fourth embodiment; and FIG. 21 is a table explaining the content of the second database at time subsequent to time at which the database has data in FIG. 20.

DESCRIPTION OF THE PREFERRED EMBODIMENTS

Embodiments of the present invention will now be described in detail below.

First Embodiment

Figure 1:
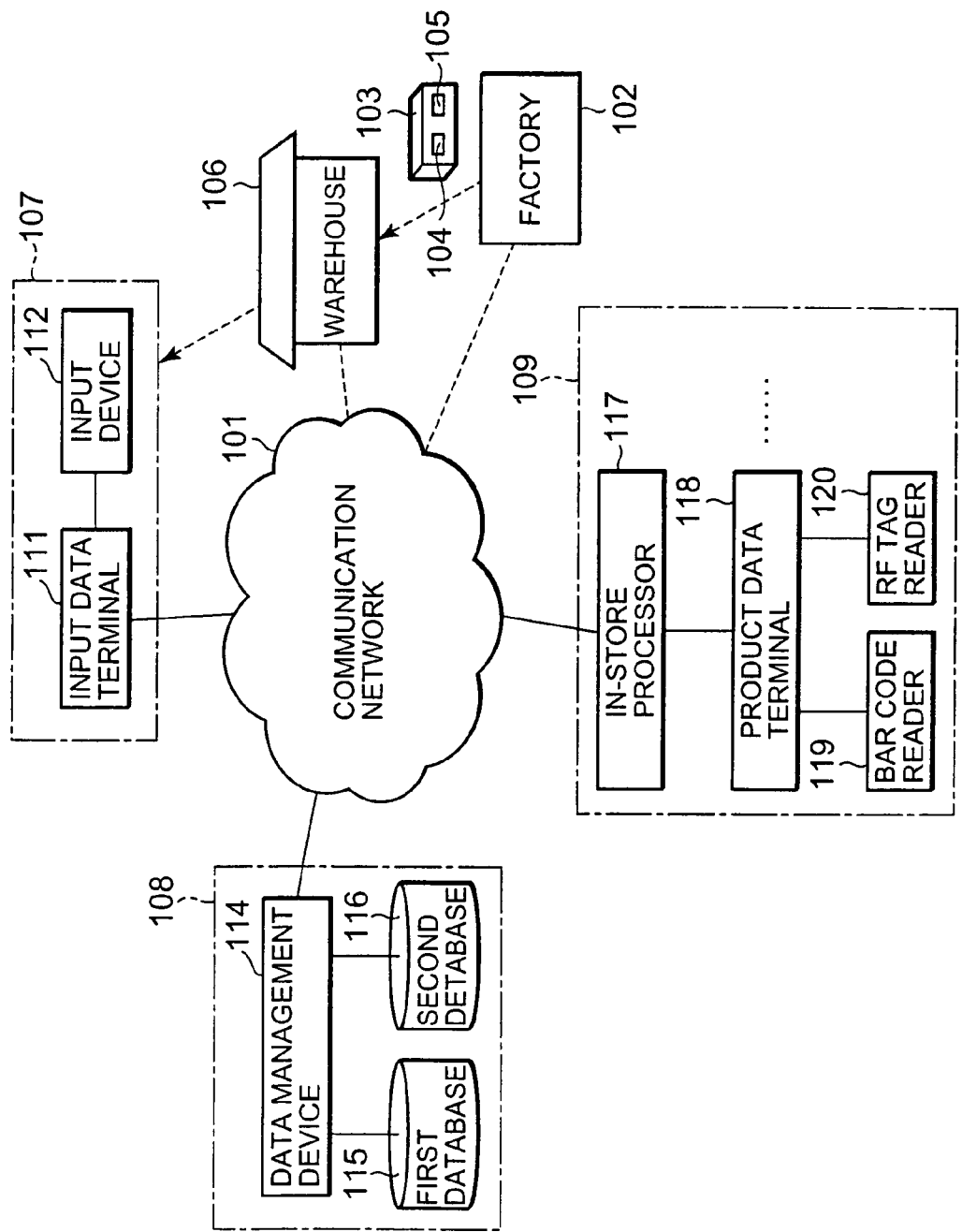
FIG. 1 is a schematic diagram of the structure of a product identification data management system according to a first embodiment of the present invention.

FIG. 1 shows an overview of a product identification data management system 100 according to a first embodiment of the present invention. The product identification data management system 100 manages products handled in stores of a specific sales company using a communication network 101 such as the Internet or an Intranet. In a factory 102, each of the products 103 is affixed with a bar code 104 indicating a manufacturer code and a product code and an RF tag 105 with identifier whereby the corresponding product can be uniquely identified. Then the products 103 are shipped out. The products 103 are stored in a warehouse 106 and appropriately delivered to a purchasing department 107 of the sales company. The purchasing department 107, an information department 108, and the store of the company 109 are connected to the communication network 101. Although one factory 102, one warehouse 106, one purchasing department 107, and one store 109 are shown in FIG. 1, the arrangement is not limited to this case. For example, if the products are purchased on a nationwide scale, the purchasing department 107 can be dispersed. Each purchasing department 107 can purchase the products fabricated in the corresponding area. The stores 109 can be dispersed in various regions. Each information department 108 can be directly connected to the corresponding purchasing department 107. Alternatively, a plurality of information departments 108 can be connected to the communication network 101 for data backup.

The purchasing department 107 includes an input data terminal 111 and an input device 112. The input data terminal 111 connects to the communication network 101 and performs various data processings. The input device 112 reads data of the bar code 104 and data of the RF tag 105 attached to each product and inputs the data to the input data terminal 111. The input data terminal 111 is a data processing unit including a personal computer or a workstation. The input data terminal 111 has a central processing unit (CPU) (not shown) and a storage medium in which a predetermined control program is stored. The input data terminal 111 relates the data of the bar code 104 to that of the RF tag 105 as described later.

The information department 108 has a data management device 114 including a personal computer, and first and second databases 115 and 116 connected to the device 114. The data management device 114 having a communication function is connected to the communication network 101. The first database 115 relates to the bar code 104. The second database 116 relates to the RF tag 105.

The store 109 includes a personal computer and has an in-store processor 117 for controlling data processing in the store. The in-store processor 117 connects to a plurality of product data terminals 118 provided for, e.g., respective cash registers via communication means such as local area network (LAN) cables. Each product data terminal 118 also includes a personal computer or a simplified data processor. The throughput of the product data terminal 118 can be lower than that of the in-store processor 117. Each product data terminal 118 connects to either or both of a bar code reader 119 and an RF tag reader 120.

Figure 2:
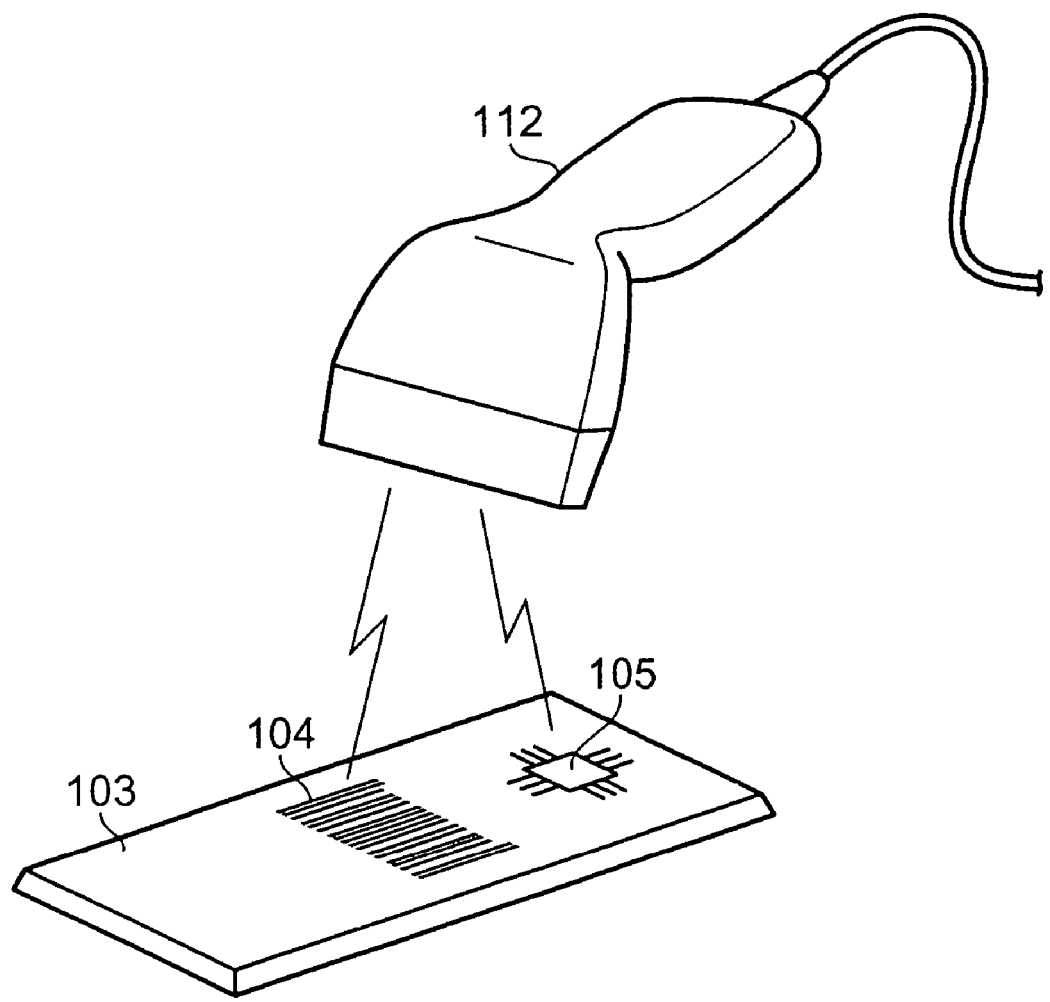
FIG. 2 is a perspective view of an input device, which is reading identification data concerned with a product, arranged in a purchasing department according to the first embodiment.

FIG. 2 shows that the input device 112 is reading the identification data of the product 103. The input device 112 has a bar code reader (not shown) and an RF tag reader (not shown). The bar code reader scans the bar code 104 of the products 103 optically. The RF tag reader reads data by receiving radio waves generated from the RF tag 105. Accordingly, when the input device 112 is moved close to the product 103, the input device 112 can read bar code data of the bar code 104 and RF tag data recorded in the RF tag 105 at the same time.

Figures 3, 4:
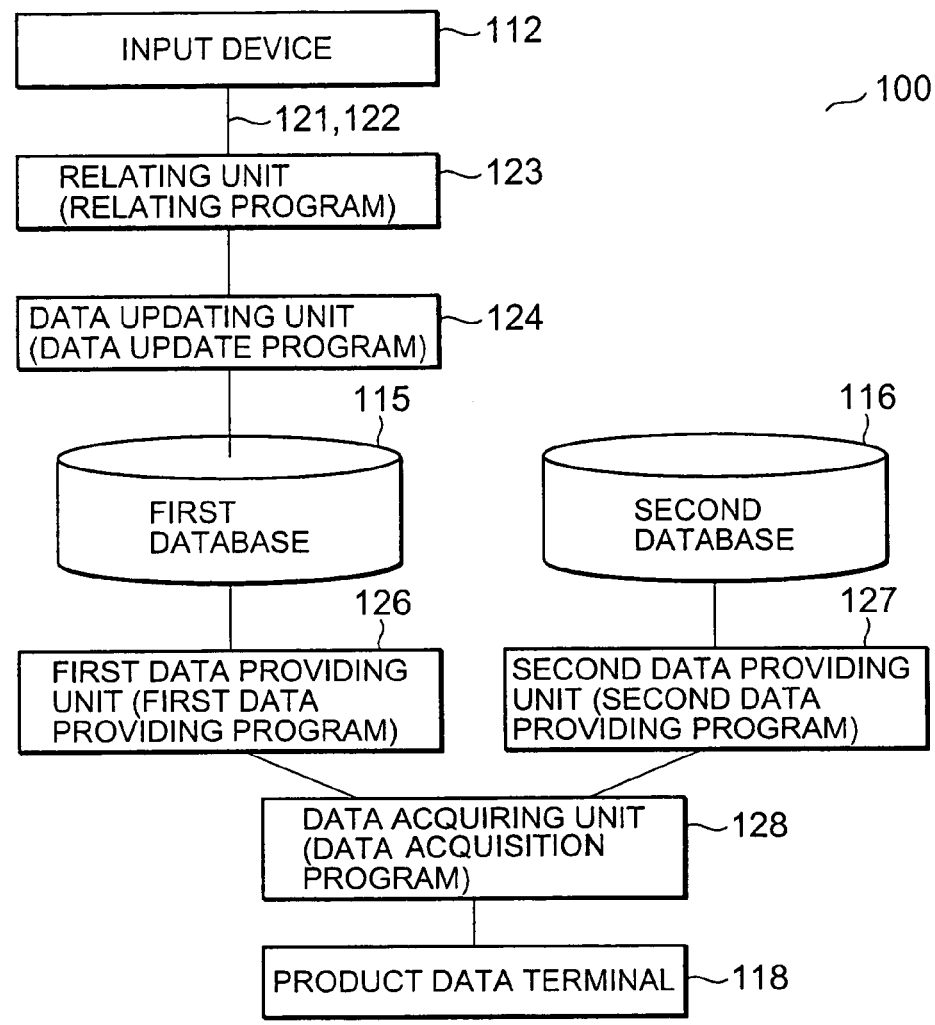
FIG. 3 is a block diagram of the principle structure of the product identification data management system according to the first embodiment.
FIG. 4 is a table explaining the content of a first database at predetermined time according to the first embodiment.

FIG. 3 shows the principle structure of the product identification data management system including the above-mentioned components. In FIG. 3, the same components as those in FIG. 1 are designated by the same reference numerals. As shown in FIG. 2, the input device 112 simultaneously reads bar code data 121 and RF tag data 122 and supplies both the data 121 and 122 to a relating unit 123. The relating unit 123 executes a relating program functioning as a part of the control program stored in the input data terminal 111 in FIG. 1, thus relating two identification data systems with each other. The relating program is stored as one part of the control program in the input data terminal 111 shown in FIG. 1. In the present specification, an explanation will be made on the assumption that an identification data system using bar code data 121 is a first identification data system and that using RF tag data 122 is a second identification data system.

The relating unit 123 in the input data terminal 111 is connected to a data updating unit 124 in the data management device 114 via the communication network 101 shown in FIG. 1. The data updating unit 124 updates the first database 115 concerned with bar code data 121 and executes update processing according to a data update program. When receiving bar code data 121 related with RF tag data 122 from the input data terminal 111, the data updating unit 124 updates the first database 115. A first data providing unit 126 provides the contents of the first database 115 to outsiders of the data management department 108 by executing a first data providing program in the data management device 114. A second data providing unit 127 provides the contents of the second database 116 to outsiders of the data management department 108 by executing a second data providing program in the data management device 114.

FIG. 4 shows an example of the content of the first database 115. Unique code data "$A_{1-1}$", "$A_{1-2}$", "$A_{1-3}$", . . . are assigned as EPCs to products, respectively. The first database 115 has records including an EPC, a bar code and three time values. As for an EPC "$A_{i-j}$", "i" indicates the value of a class field and "j" indicates the value of an instance field. As for a bar code "Bi", "i" identify the value thereof. Each of the time values signifies the time when the input device 112 scans an EPC and a bar code. These time values are recorded in the factory 102, the warehouse 106 and the store 109 shown in FIG. 1.

As shown by broken lines in FIG. 1, the factory 102 and the warehouse 106 can be connected to the communication network 101 as needed. The factory 102, the warehouse 106 and the store 109 can have same input device as the input device 112 shown in FIG. 1.

FIG. 5 shows an example of the content of the second database 116. The second database 116 has records including a bar code, the description of a product, and the size thereof.

Again referring to FIG. 3, a data acquiring unit 128 is included in the in-store processor 117 shown in FIG. 1. When the data acquiring unit 128 receives the identification data from a product data terminal 118, it acquires the data correspond to the identification data from the first data providing unit 126, the second data providing unit 127. Then the data acquiring unit 128 can acquire additional data based on the already acquired data if it is necessary. For example, if the data acquiring unit 128 can not acquire the description and the size of the product, which is needed to be acquired, from the first data providing unit 126, it then acquires the data from the second data providing unit 127. A CPU (not shown) in the in-store processor 117 executes a data acquisition program to realize the data acquiring unit 128. The product data terminal 118 serving as a user terminal includes a display (not shown) for visually displaying acquired data and a printer (not shown) for printing out acquired data.

The operation of the product identification data management system according to the present embodiment will now be described in detail. The description consists of two parts, the ID relating process and the data acquisition process. In the ID relating process, the relating unit 123 relates the bar code data 121 and the RF tag data 122 with each other. In the data acquisition process, the data acquisition unit 128 acquires the data from the databases 115 and 116 and provides them to the product data terminal 118.

ID Relating Process

An explanation will now be made in the case where the input device 112 shown in FIG. 3 reads an EPC (RF tag) "$A_{2-1}$" and a bar code "$B_2$".

FIG. 6 shows a flowchart of a process of the relating unit 123. After receiving the bar code and the EPC, the relating unit 123 (FIG. 3) extracts the class field "2" of the EPC "$A_{2-1}$" (step S201). Then, the relating unit 123 requests the data updating unit 124 to write "$B_2$" as a data item "BAR CODE" of the records having the class field "2" of the EPC (step S202).

FIG. 7 shows a flowchart of a process of the data updating unit 124. If the first database 115 has the data shown in FIG. 4, the data updating unit 124 writes "$B_2$" as the data item "BAR CODE" which corresponds to the records of "$A_{2-1}$" and "$A_{2-2}$" as the data item "EPC" in the first database 115 (step S221).

FIG. 8 shows the content of the first database 115 after the step S221.

Data Acquisition by Terminal User

Figure 9:
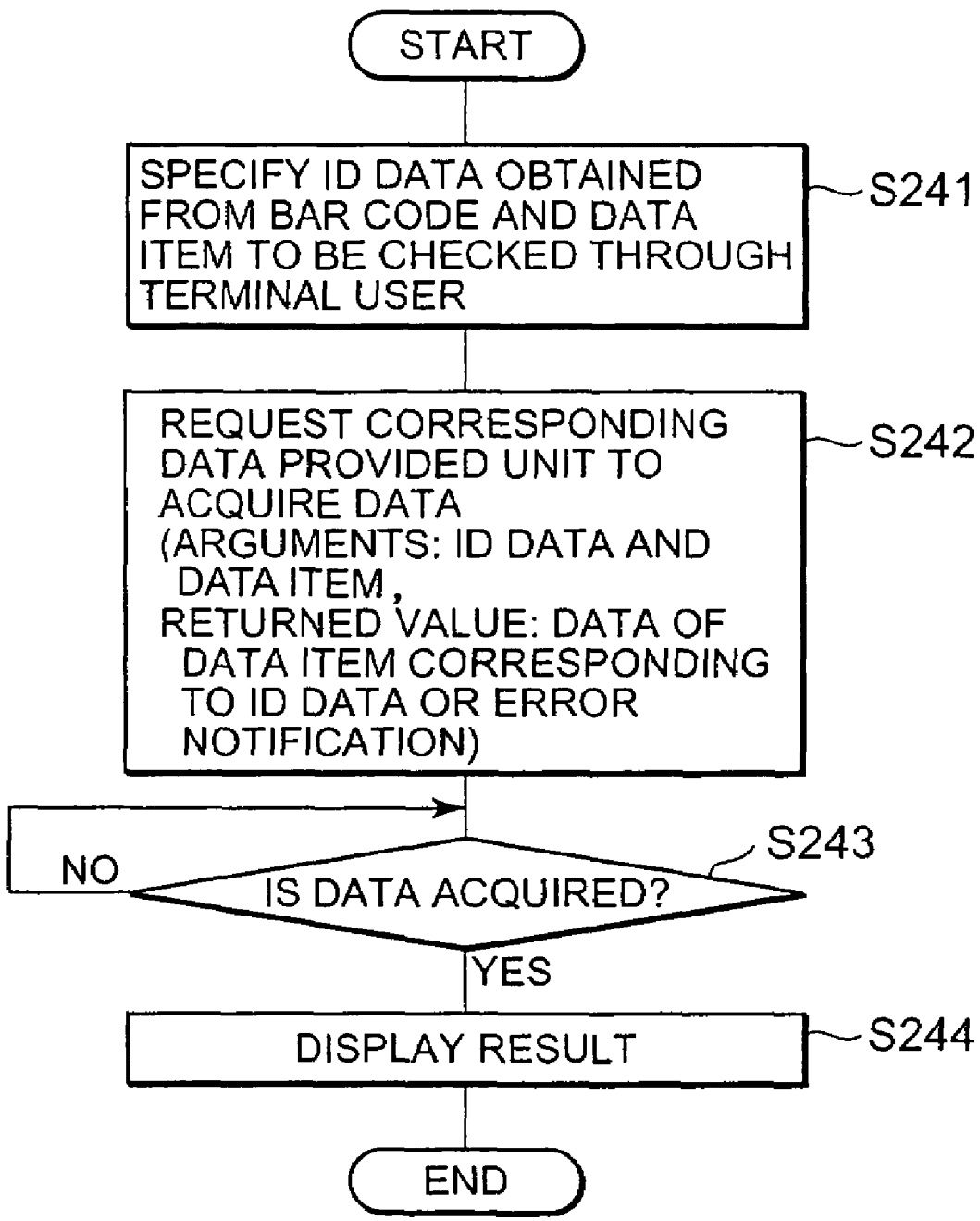
FIG. 9 is a flowchart of a process of a product data terminal when a terminal user issues a request to acquire data concerned with a product in the first embodiment.
Figure 10:
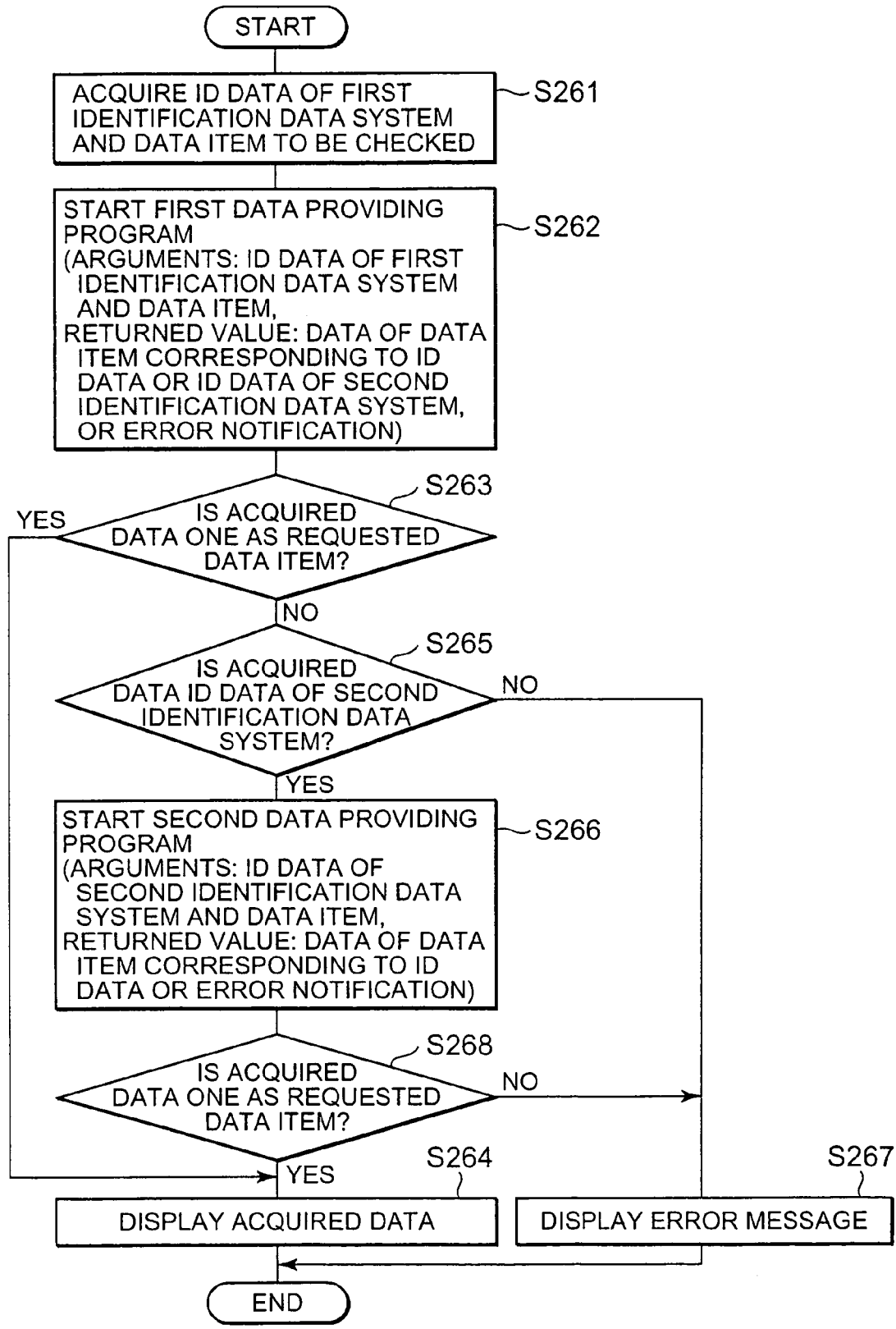
FIG. 10 is a flowchart of a process of an in-store processor when the terminal user issues a request to acquire data concerned with the product in the first embodiment.

FIG. 9 shows a flowchart of a process of the product data terminal 118 when a terminal user issues a request to acquire data concerned with a product FIG. 10 shows a flowchart of a process of the in-store processor 117 for the request. In other words, when a request to acquire data concerned with a product is sent from an arbitrary product data terminal 118, the data management device 114 shown in FIG. 1 is accessed through the in-store processor 117, so that necessary data is obtained from the first data providing unit 126 (FIG. 3) or the second data providing unit 127 (FIG. 3).

It is assumed that the product data terminal 118 includes, for example, only the bar code reader 119 (FIG. 1) and the terminal user sends a request to check predetermined data on the basis of bar code data, which is obtained by reading a bar code affixed on a product. In the store 109 (FIG. 1), the terminal user operates the product data terminal 118 to specify ID data obtained from the bar code data and a data item the user wants to check (step S241). In this instance, for the purpose of selection, the CPU allows the display (not shown) to display, for example, data items to be checked. The CPU is in standby mode until the user selects a desired data item from the displayed items. It is assumed that the user selects the description of the corresponding product as a desired data item. Assuming that the EPC "$A_{2-1}$" and "DESCRIPTION" are used as arguments and data of the data item corresponding to ID data or an error notification in the event of an error is used as a returned value, the data acquiring unit 128 requests the first data providing unit 126 shown in FIG. 3 to acquire data (step S242). The data acquiring unit 128 is in standby mode until data acquired from the first database 115 is transmitted from the first data providing unit 126 (step S243). If data is acquired (YES in step S243), a result (including the error notification) is displayed in the display of the product data terminal 118 (step S244).

Referring to FIG. 10, the in-store processor 117 receives the request for data acquisition to the first data providing unit 126 from the product data terminal 118 according to the processing step in S242 of FIG. 9 (step S261). Then, the in-store processor 117 starts the first data providing program to activate the first data providing unit 126 (step S262). ID data of the first identification data system and data of a data item the user wants to check are used as arguments. Data of the data item corresponding to the ID data, ID data of the second identification data system, or an error notification in the event of an error is used as a returned value.

Figure 11:
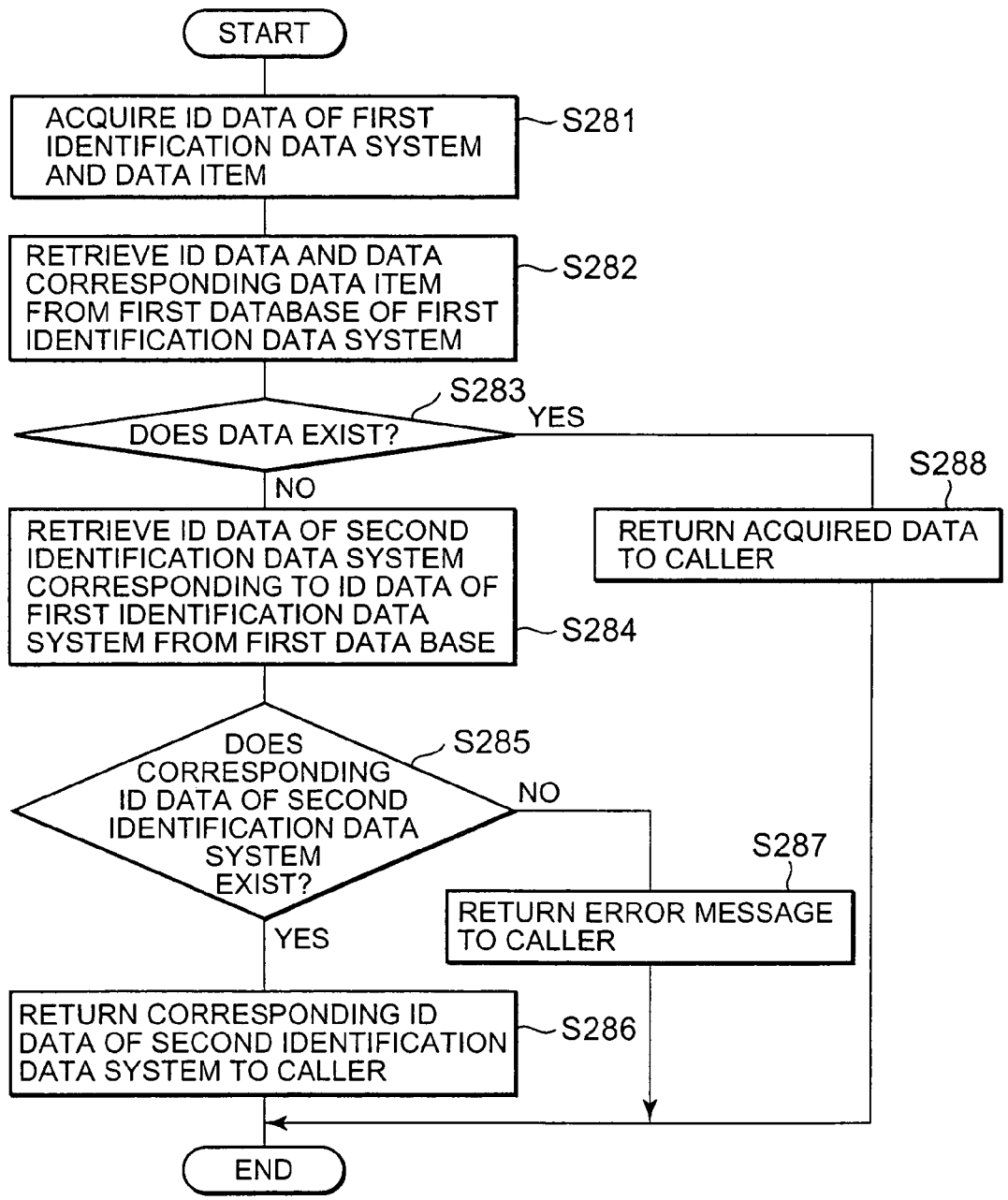
FIG. 11 is a flowchart specifically showing a process of a first data providing unit according to the first embodiment.

FIG. 11 specifically shows a process of the first data providing unit 126. The process corresponds to the processing step in S262. The first data providing unit 126, realized by the first data providing program, acquires ID data of the first identification data system and a data item to be checked from the data acquiring unit 128 (FIG. 3) (step S281). The first data providing unit 126 refers to the first database 115 concerned with the first identification data system to retrieve data corresponding to the ID data and the data item therefrom (step S282). Specifically, data of the data item "DESCRIPTION" corresponding to the EPC "$A_{2-1}$" is retrieved from the first database 115 shown in FIG. 8.

However, the first database 115 has no data item "DESCRIPTION" (NO in step S283). In this case, ID data of the second identification data system corresponding to the ID data of the first identification data system is retrieved with reference to the first database 115 concerned with the first identification data system (step S284). Then, data "$B_2$" of the data item "BAR CODE" corresponding to the EPC "$A_{2-1}$" exists in the first database 115 (YES in step S285). Thus, the first data providing unit 126 acquires the data "$B_2$" and returns this data of the data item "BAR CODE" to the data acquiring unit 128 (FIG. 3) (step S286). The process terminates (END).

If there is no ID data of the corresponding second identification data system in step S285 (NO in step S285), an error message is returned to the data acquiring unit 128 as a caller (step S287). The process terminates (END). If the first database 115 in FIG. 8 has data of the data item "DESCRIPTION" in step S283, acquired data is returned to the data acquiring unit 128 as a caller (step S288). The process terminates (END).

Again referring to FIG. 10, when data requested in step S262 described above with reference to FIG. 11 is sent from the first data providing unit 126, whether the acquired data is data as the requested data item is determined (step S263). In this case, the description of the corresponding product is requested. When the description thereof is transmitted from the first data providing unit 126 (YES in step S263), the data is displayed on the display of the product data terminal 118 (step S264). The process terminates (END). In other words, when the description of the product is returned as acquired data in step S288 of FIG. 11, the acquired data is displayed on the display. When the printer (not shown) is connected to the product data terminal 118, the result can be printed out.

On the other hand, if acquired data of a data item different from the requested data item is transmitted (NO in step S263), whether the acquired data is ID data of the second identification data system is determined (step S265). In this case described here, the first database 115 includes no data item "DESCRIPTION" (NO in step S283 of FIG. 11). The first data providing unit 126 returns the data "$B_2$" as data of the data item "BAR CODE" to the data acquiring unit 128 (FIG. 3) (step S286 in FIG. 11). Therefore, the acquired data is ID data of the second identification data system which is different from the first identification data system (YES in step S265 in FIG. 10). The process proceeds to step S266. The second data providing program is started, thus operating the second data providing unit 127 (FIG. 3). ID data of the second identification data system and a data item to be checked are used as arguments. In other words, the program is called with the bar code data "$B_2$" and "DESCRIPTION" as arguments. Data of the data item corresponding to the ID data or an error notification in the event of an error is used as a returned value. This will be described below. In other cases (NO in step S265), the description of the product is not known. Thus, an error message is displayed on the display (step S267). If the printer is connected to the product data terminal 118 as mentioned above, the result can be printed out.

Figure 12:
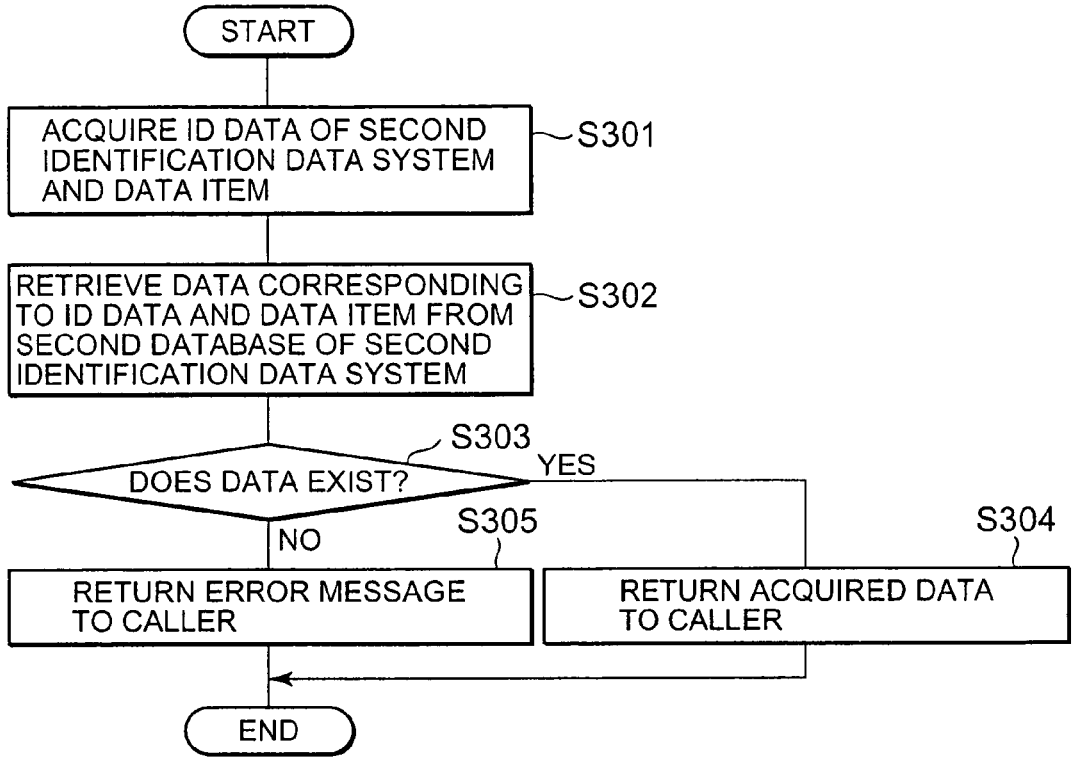
FIG. 12 is a flowchart specifically showing a process of a second data providing unit according to the first embodiment.

FIG. 12 shows a flowchart of a process of the second data providing unit 127. This process corresponds to the processing step in S266. The second data providing unit 127 is realized by the second data providing program. First, the second data providing unit 127 acquires ID data of the second identification data system and a data item the user wants to check from the data acquiring unit 128 (FIG. 3) (step S301). Subsequently, the second data providing unit 127 refers to the second database 116 concerned with the second identification data system to retrieve data corresponding to the ID data and the data time therefrom (step S302). Specifically, data of the data item "DESCRIPTION" corresponding to the bar code data "$B_2$" is retrieved from the second database 116 in FIG. 5.

In the second database 116, data indicating "CHOCOLATE" is written as the corresponding data item "DESCRIPTION". Therefore, the corresponding data exists (YES in step S303). The second data providing unit 127 returns the data "CHOCOLATE" to the data acquiring unit 128 (FIG. 3) as a caller (step S304). The process terminates (END). If the corresponding data is not acquired (NO in step S303), the second data providing unit 127 returns an error message to the data acquiring unit 128 (step S305). The process terminates (END).

Again referring to FIG. 10, when data requested in step S266 described above with reference to FIG. 12 is sent from the second data providing unit 127, whether the acquired data is data as the requested data item is determined (step S268). In this case, the data "CHOCOLATE" corresponding to the product is acquired (YES in S268). The acquired data is displayed on the display of the product data terminal 118 (step S264). The process terminates (END). In other words, "CHOCOLATE" is displayed as the description of the product on the display. If the printer is connected to the product data terminal 118, the result can be printed out. As mentioned above, the user of the product data terminal 118 serving as the user terminal can acquire data of the second database 116 concerned with the second identification data system. The acquired data is not directly obtained from the bar code 104.

On the other hand, if it is determined in step S268 that data of the requested data item is not acquired (NO in step S268), the process proceeds to step S267. An error message is displayed on the display of the product data terminal 118. When the printer is connected to the product data terminal 118, the result can also be printed out.

As mentioned above, in the product identification data management system according to the first embodiment, ID data of an RF tag is independent of that of a bar code until they are related with each other. Therefore, bar codes attached to products can be managed independently of RF tags. In other words, in manufacturing RF tags while an EPC is written into each RF tag, it is unnecessary to consider relationship with bar codes.

Second Embodiment

Figure 13:
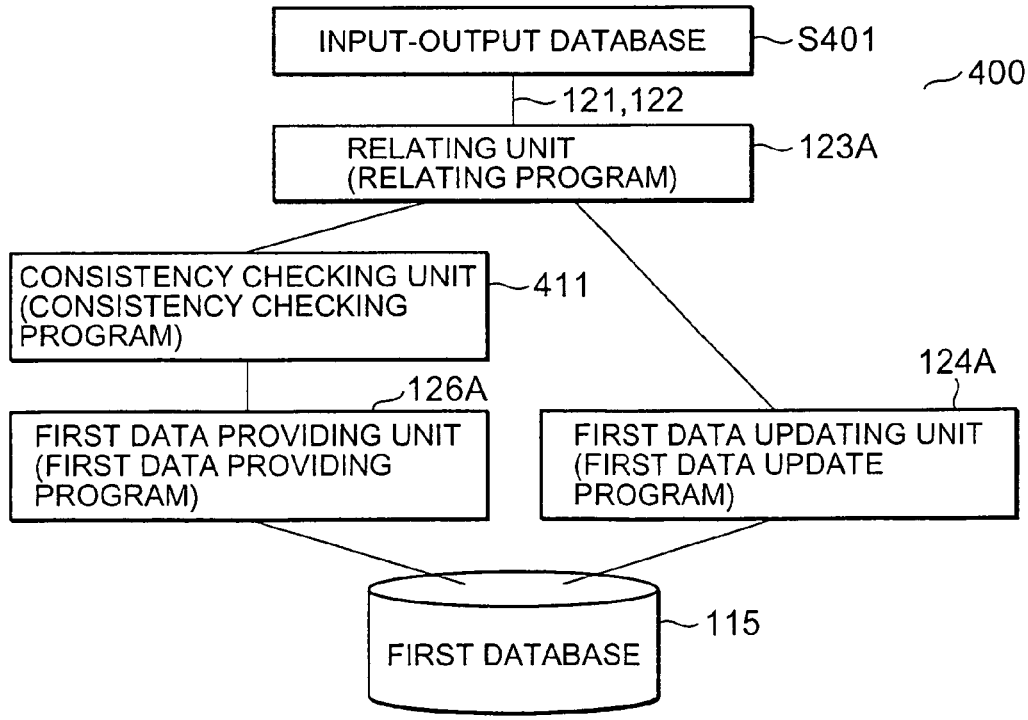
FIG. 13 is a block diagram of the principle structure of an essential part of a product identification data management system according to a second embodiment of the present invention.

FIG. 13 shows the principle structure of an essential part of a product identification data management system 400 according to a second embodiment of the present invention. In FIG. 13, the same components as those in FIG. 3 are designated by the same reference numerals and the description thereof is omitted as appropriate. The entire structure of the product identification data management system 400 according to the second embodiment will be described using FIG. 1 relating to the first embodiment as needed.

An input-output device 401 has a function for simultaneously reading a bar code and an RF tag and a notifying function for checking the consistency between the class of an EPC, obtained from the read RF tag, and that of bar code data and making an error notification only when a wrong combination of the bar code and the RF tag is affixed on the product.

Figure 14:
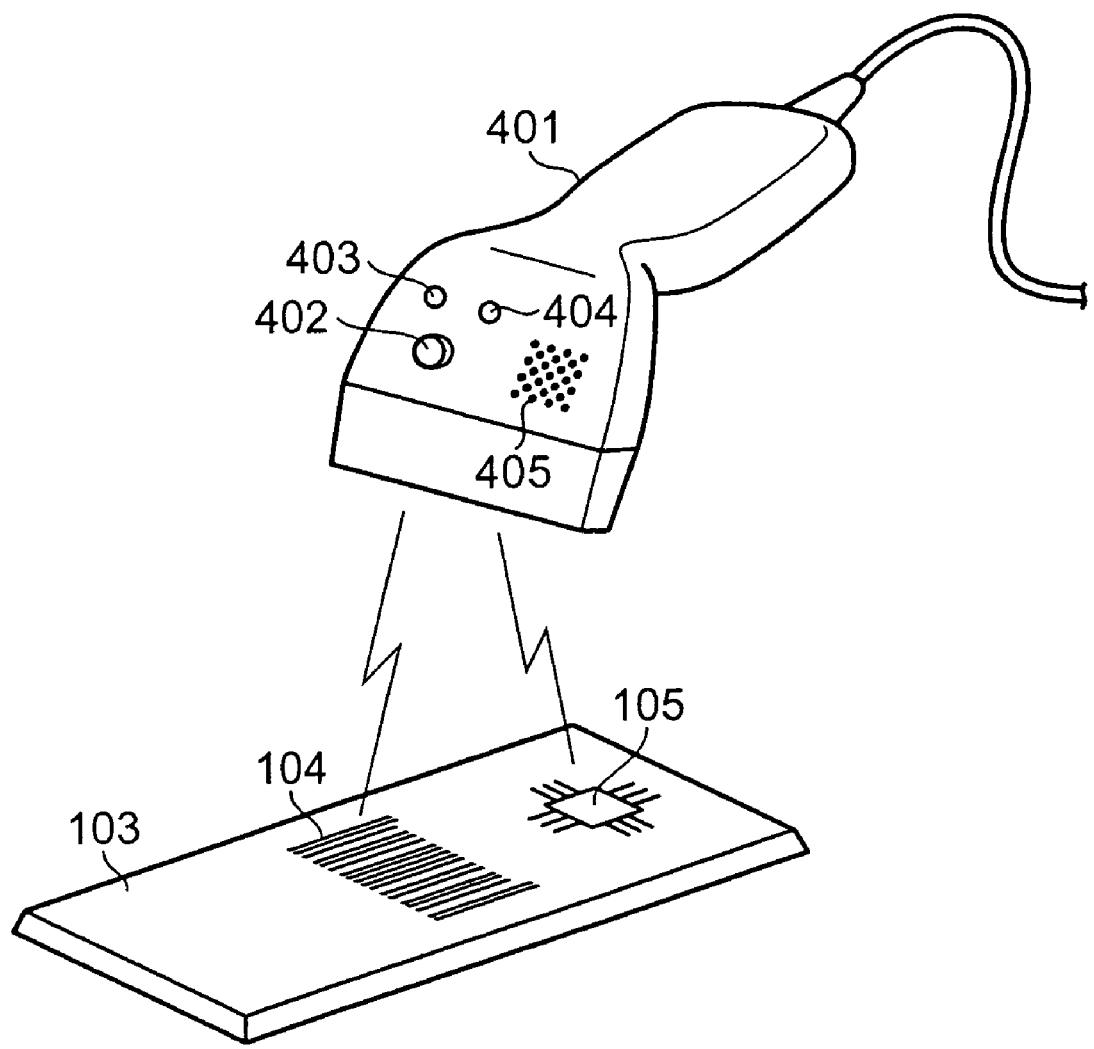
FIG. 14 is a perspective view of an input-output device, which is reading identification data of a product, according to the second embodiment.

FIG. 14 shows the input-output device 401 which is reading identification data of a product 103. The input-output device 401 includes a selector switch 402, first and second indicators 403 and 404, and a built-in speaker 405 in the head thereof. The selector switch 402 functions as a push-button switch. When being pushed, the selector switch 402 enters a consistency check mode, so that the first indicator 403 lights up. In this mode, the input-output device 401 checks the consistency between the class of a bar code 104 and that of an RF tag 105. While the selector switch 402 is being released (projected), the second indicator 404 lights up. In this mode, similar to the first embodiment, bar code data is related with RF tag data on the assumption that the consistency between the bar code and the RF tag is obtained. The latter mode will be called a relation register mode. When it is determined that there is no consistency between the class of an EPC and that of the bar code, the built-in speaker 405 sounds an alarm.

Again referring to FIG. 13, bar code data 121 and RF tag data 122 obtained by reading the bar code 104 and the RF tag 105 are supplied to a relating unit 123A. A relating program as a part of a control program stored in an input data terminal 111 shown in FIG. 1 is executed, thus realizing the relating unit 123A for relating two identification data systems with each other. The relating program is stored as one part of the control program in the input data terminal 111 shown in FIG. 1.

When the input-output device 401 is in the consistency check mode, the relating unit 123A is connected to a consistency checking unit 411. The consistency checking unit 411 and a first data providing unit 126A are arranged in a data management device 114. A CPU in the data management device 114 executes a consistency checking program, thus realizing the consistency checking unit 411. Similarly, the CPU in the data management device 114 executes a first data providing program, thus realizing the first data providing unit 126A.

Similar to the first embodiment, a first data updating program is executed, thus realizing a first data updating unit 124A. The first data updating unit 124A updates a first database 115. Only when the input-output device 401 is in the relation register mode, the first data updating unit 124A operates. According to the present embodiment, the content of the first database 115 is as shown in FIG. 8.

Figure 15:
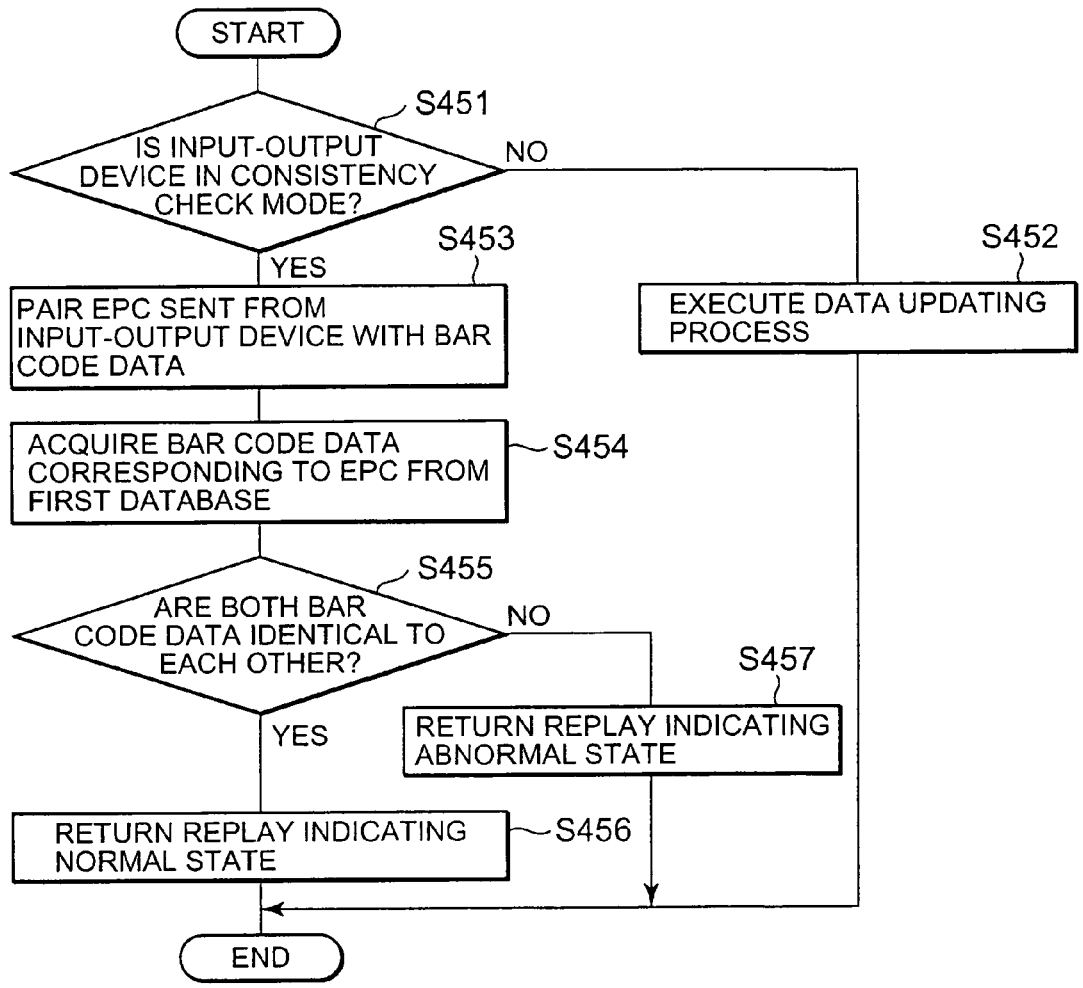
FIG. 15 is a flowchart mainly showing a process in a consistency check mode according to the second embodiment.

FIG. 15 shows a flowchart of a process in the consistency check mode according to the present embodiment. The data management device 114 in FIG. 1 checks data concerned with the selector switch 402 transmitted from the input-output device 401 to determine whether the input-output device 401 is in the consistency check mode (step S451). If it is determined that the device 401 is in the relation register mode (NO in step S451), the data updating process is performed in a manner similar to the first embodiment (step S452).

On the other hand, if it is determined that the device 401 is in the consistency check mode (YES in step S451), the bar code data 121 transmitted from the input-output device 401 is paired with and the RF tag data (EPC) 122 similarly sent therefrom and the combination is stored in a predetermined working storage area (not shown) (step S453). Bar code data corresponding to the EPC is acquired from the first database 115 through the first data providing unit 126A (step S454). Subsequently, whether the bar code data 121 transmitted from the input-output device 401 is identical to the acquired bar code data is checked (step S455). If both the data are identical to each other (YES in step S455), the consistency between the class of the bar code 104 and that of the RF tag 105 attached on the product 103 is obtained. In this case, a reply indicating a normal state, i.e., the correct combination is returned to the input-output device 401 (step S456). The built-in speaker 405 of the input-output device 401 sounds a tone indicating the normal state.

On the other hand, if the bar code data 121 read through the input-output device 401 is different from the bar code data acquired from the first database 115 with respect to the same RF tag data (NO in step S455), the data management device 114 generates a reply indicating an abnormal sate, i.e., the wrong combination to the input-output device 401 (step S457). When the input-output device 401 receives the reply, the built-in speaker 405 sounds an alarm such as a beep indicating the abnormal state. Therefore, a user of the input-output device 401 can easily check the consistency between the class of an EPC and that of an RF tag in combination affixed on each product 103.

Third Embodiment

Figures 16, 17:
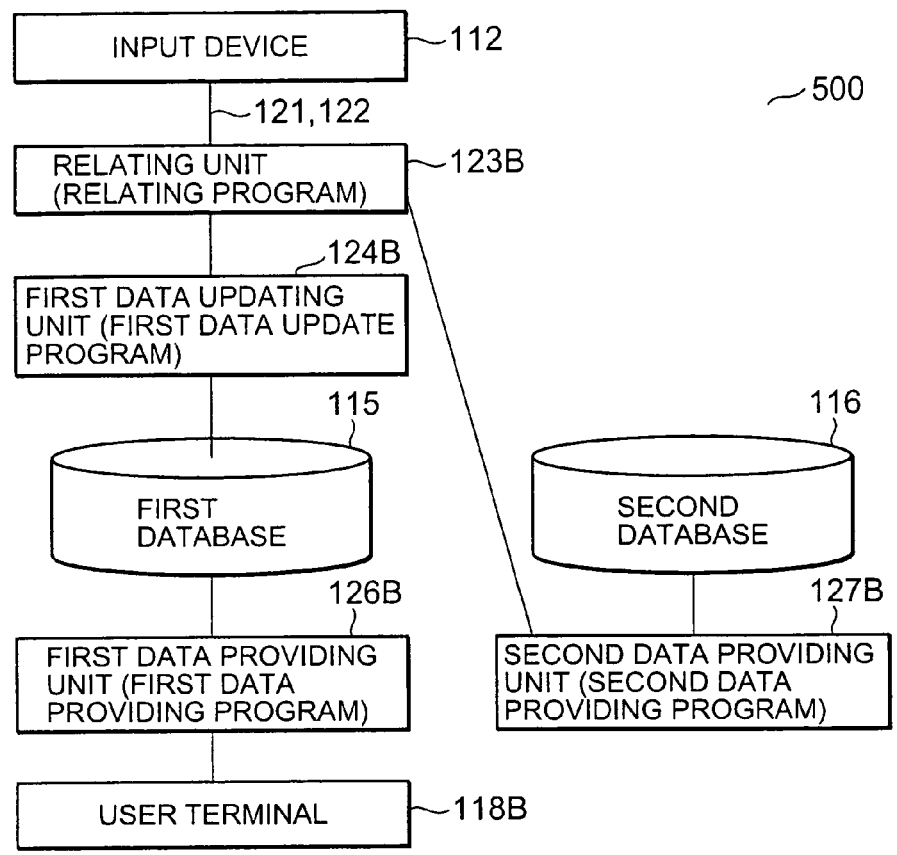
FIG. 16 is a block diagram of the principle structure of an essential part of a product identification data management system according to a third embodiment of the present invention.
FIG. 17 is a table explaining the content of a first database at certain time according to the third embodiment.

FIG. 16 shows the principle structure of an essential part of a product identification data management system 500 according to a third embodiment of the present invention. In FIG. 16, the same components as those in FIG. 3 are designated by the same reference numerals and the description thereof is omitted as appropriate. The entire structure of the product identification data management system 500 according to the third embodiment will be described using FIGS. 1 and 2 relating to the first embodiment as needed.

In the product identification data management system 500, each input device 112 simultaneously reads a bar code and an RF tag as shown in FIG. 2 and supplies bar code data 121 and RF tag data 122 to a relating unit 123B. According to the present embodiment, actually, the input devices 112 are arranged in a factory 102, a warehouse 106, and a purchasing department 107 shown in FIG. 1, respectively. The relating unit 123B allows a first data updating unit 124B to update a first database 115 with reference to a second database 116 on the basis of bar code data each time each product passes through the corresponding location. Accordingly, a user terminal 118B such as a product data terminal 118 in FIG. 1 can acquire necessary data from the first database 115 which is updated overtime. The user terminal 118B includes a display (not shown) for displaying a result concerned with data requested by a user.

FIG. 17 shows the content of the first database 115 at some point. In the first database 115, data of a data item "DESCRIPTION" and data of a data item "SIZE" are recorded in correspondence with respective EPCs "$A_{1-1}$" to "$A_{1-3}$". Regarding each of data items "FACTORY", "WAREHOUSE", and "STORE", date and time at which each product passes through the corresponding location is recorded. FIG. 5 shows the content of the second database 116 corresponding to that of the first database 115 shown in FIG. 17.

In the product identification data management system 500 with the above-mentioned structure according to the third embodiment, a database concerned with EPCs (EPC database) can be constructed with reference to a database concerned with bar code data (bar code database) and the user can refer to the constructed database using the user terminal 118B. This case will now be described. When an EPC and bar code data to be related with each other are determined, the user of the user terminal 118B acquires data regarding the bar code data from the bar code database and then writes the acquired data in a format of the EPC database. This process will now be described below such that the process is divided into an ID relating process and data acquisition by the terminal user.

ID Relating Process

An explanation will now be made with respect to a case where "$A_{2-2}$" as an EPC (RF tag) and bar code data "$B_2$" to be related with each other are supplied from the input device 112 in FIG. 16 to the relating unit 123B. As mentioned above, a bar code and an RF tag are simultaneously read using the input device 112 as shown in FIG. 2, so that bar code data and RF tag data can be easily used as combination data. To acquire data corresponding to the bar code data "$B_2$", the relating unit 123B calls a second data providing program according to the relating program, thus realizing a second data providing unit 127B.

The second data providing unit 127B acquires data corresponding to the bar code data "$B_2$" from the second database 116 concerned with the second identification data system. The second database 116 stores data shown in FIG. 5. Specifically, the second data providing unit 127B acquires data indicating "CHOCOLATE" as the description of a product and data indicating "S" as the size thereof, which correspond to the bar code data "$B_2$". The second data providing unit 127B returns the acquired data to the relating unit 123B.

Since the class field of the EPC "$A_{2-2}$" indicates "2", the relating unit 123B instructs the first data updating unit 124B to write the data "CHOCOLATE" and the data "S" as the data items "DESCRIPTION" and "SIZE" corresponding to each EPC having a class field "2". When receiving such an instruction, the first data updating unit 124B writes the data "CHOCOLATE" and the data "S" as the data items "DESCRIPTION" and "SIZE" corresponding to each of EPCs "$A_{2-1}$" and "$A_{2-2}$", respectively.

Figures 18, 19:
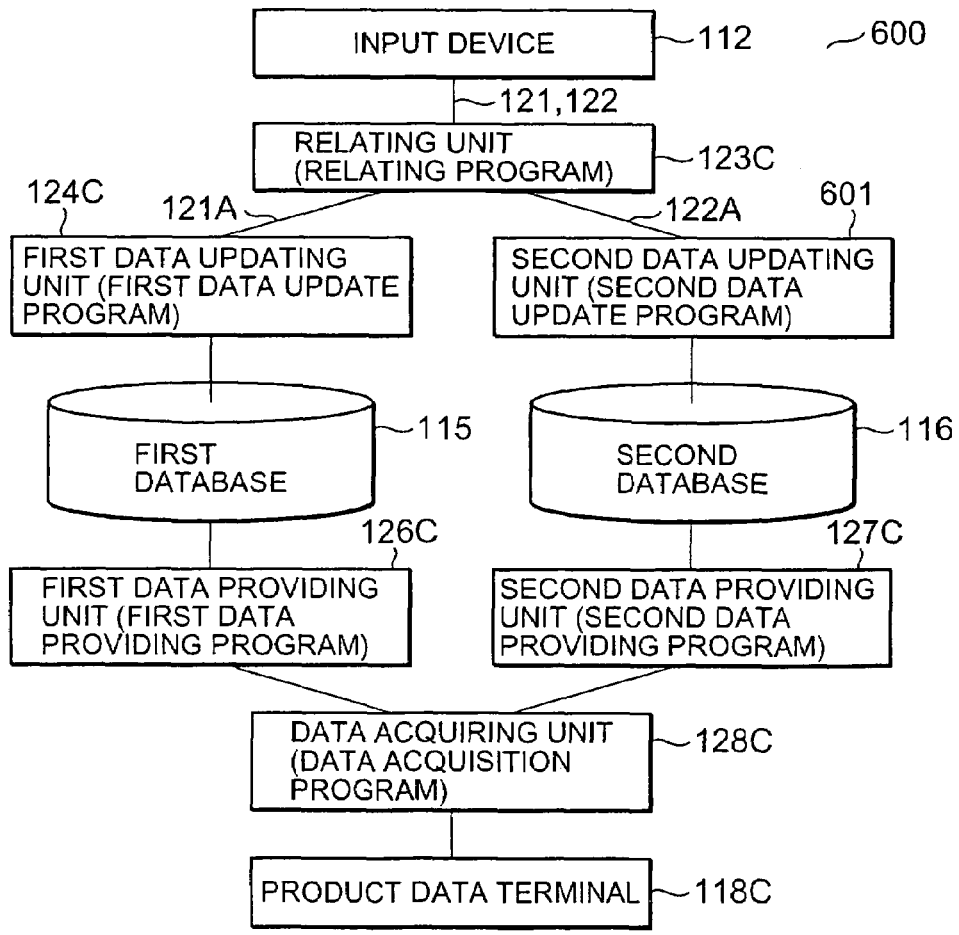
FIG. 18 is a table explaining the content of the first database at time subsequent to the certain time in FIG. 17.
FIG. 19 is a block diagram of the principle structure of an essential part of a product identification data management system according to a fourth embodiment of the present invention.

FIG. 18 shows the content of the first database 115 as a result of update by the first data updating unit 124B. "CHOCOLATE" and "S" are newly recorded as the data items "DESCRIPTION" and "SIZE" corresponding to the EPCs "$A_{2-1}$" and "$A_{2-2}$".

Data Acquisition by Terminal User

An explanation will now be made with respect to a case where the user retrieves data of the data item "DESCRIPTION" corresponding to the EPC "$A_{2-2}$" using the user terminal 118B. Data currently stored in the first database 115 concerned with the first identification data system is as shown in FIG. 18. Accordingly, a first data providing unit 126B retrieves the EPC "$A_{2-2}$" from the first database 115, thus acquiring data "CHOCOLATE" as the data item "DESCRIPTION". The first data providing unit 126B returns a result of the retrieval to the user terminal 118B. The user terminal 118B allows the display to display the result.

Fourth Embodiment

FIG. 19 shows the principle structure of an essential part of a product identification data management system 600 according to a fourth embodiment. In FIG. 19, the same components as those in FIG. 3 are designated by the same reference numerals and the description thereof is omitted as appropriate. The entire structure of the product identification data management system 600 according to the fourth embodiment will be described using FIG. 1 relating to the first embodiment as needed.

An input device 112 simultaneously reads a bar code and an RF tag as shown in FIG. 2 and supplies bar code data 121 and RF tag data 122 to a relating unit 123C. A relating program as a part of a control program stored in an input data terminal 111 shown in FIG. 1 is executed, thus realizing the relating unit 123C for relating two identification data systems with each other. The relating program is stored as one part of the control program in the input data terminal 111 shown in FIG. 1.

The relating unit 123C in the input data terminal 111 is connected to each of a first data updating unit 124C and a second data updating unit 601 in a data management device 114 through a communication network 101. The first data updating unit 124C updates a first database 115 concerned with the bar code data 121 according to a first data update program. When receiving bar code data 121A related with the RF tag data 122 from the input data terminal 111, the first data updating unit 124C updates the first database 115. A first data providing program is executed, thus realizing a first data providing unit 126C in the data management device 114. The first data providing unit 126C makes data stored in the first database 115 available to outsiders of a information department 108.

The second data updating unit 601 updates a second database 116 concerned with the RF tag data 122 according to a second data update program. When receiving RF tag data 122A related with the bar code data 121 from the input data terminal 111, the second data updating unit 601 updates the second database 116. A second data providing program is executed, thus realizing a second data providing unit 127C. The second data providing unit 127C makes data stored in the second database 116 available to the outsiders of the information department 108.

An in-store processor 117 in a store 109 shown in FIG. 1 includes a data acquiring unit 128C for acquiring data regarding identification data. On the basis of product data read by a bar code reader 119 or an RF tag reader 120 of a product data terminal 118C, or data similarly obtained by other means, the data acquiring unit 128C acquires necessary data from the first data providing unit 126C or the second data providing unit 127C when it is necessary to further acquire data. For example, when the specific description and size of a product cannot be known from bar code data and it is necessary to acquire data regarding the description and size thereof, the data acquiring unit 128C can acquire the data on the basis of the bar code data from the second database 116 through the second data providing unit 127C. A CPU (not shown) in the product data terminal 118C executes a data acquisition program, thus realizing the data acquiring unit 128C. The product data terminal 118C as a user terminal may include a display (not shown) for visually displaying acquired data and a printer (not shown) for printing out the acquired data.

According to the fourth embodiment, the first database 115 concerned with the first identification data system stores data shown in FIG. 4 and the second database 116 concerned with the second identification data system stores data shown in FIGS. 5 and 20. Referring to FIG. 20, in the second database 116, different EPCs "$A_{1-1}$", "$A_{1-2}$", and "$A_{1-3}$" are recorded in correspondence with one bar code data "$B_1$". In this case, one bar code data corresponds to a plurality of EPCs. For the correlation between bar code data and EPCs, two kinds of correlations therebetween in FIGS. 5 and 20 are managed separately from each other. Thus, data can be easily handled.

According to the present embodiment, an explanation will now be made with respect to a case where each bar code data and each EPC (RF tag) are mutually related with each other and a user refers to a database concerned with EPCs as data corresponding to bar code data. To retrieve bar code data, the useRFirst refers to the first database 115 as a bar code database. In some cases, the first database 115 does not include data to be retrieved. In this case, according to the present embodiment, the user refers to the second database 116 as a database concerned with related RF tag data. A process of the system according to the present embodiment will now be described below such that the process is divided into an ID relating process and data acquisition by a terminal user.

ID Relating Process

An explanation will be made with respect to a case where the input device 112 shown in FIG. 19 supplies "$A_{2-1}$" as an EPC (RF tag) and bar code data "$B_2$" to be related with each other to the relating unit 123C. In the use of the input device 112 as shown in FIG. 2, as mentioned above, a bar code and an RF tag can be simultaneously read and be easily used as combination data. Relating includes first to third patterns. According to the first pattern, the bar code data "$B_2$" is related with the EPC "$A_{2-1}$". According to the second pattern, the EPC "$A_{2-1}$" is related with the bar code data "$B_2$". According to the third pattern, the EPC "$A_{2-1}$" and the bar code data "$B_2$" are mutually related with each other.

Relating methods include a first method for determining a relating pattern based on the order of ID data supplied from the input device 112 and a second method for mutually relating an EPC and bar code data independently of input order. As a first example, to relate the bar code data "$B_2$" with the EPC "$A_{2-1}$", the relating unit 123C calls the first data update program to activate the first data updating unit 124C. As a second example, to relate the EPC "$A_{2-1}$" with the bar code data "$B_2$", the relating unit 123C calls the second data update program to activate the second data updating unit 601. As a third example, to mutually relate the EPC "$A_{2-1}$" and the bar code data "$B_2$" with each other, the relating unit 123C calls the first and second data update programs to activate both of the first data updating unit 124C and the second data updating unit 601.

The third example will now be described in detail. In this example, the relating unit 123C first calls the first data update program to activate the first data updating unit 124C. Subsequently, the bar code data "$B_2$" is written as the data item "BAR CODE" corresponding to each of the EPCs "$A_{2-1}$" and "$A_{2-2}$" in the first database 115 concerned with the first identification data system in the same way as the ID relating process according to the first embodiment. Consequently, the content of the first database 115 shown in FIG. 4 is updated to that shown in FIG. 8.

After that, the first data updating unit 124C acquires all EPCs corresponding to the bar code data "$B_2$" from the first database 115 of the first identification data system and transmits the acquired EPCs to the relating unit 123C. The EPCs transmitted to the relating unit 123C are "$A_{2-1}$" and "$A_{2-2}$".

The relating unit 123C instructs the second data updating unit 601 to register the EPCs "$A_{2-1}$" and "$A_{2-2}$" so as to correspond to the bar code data "$B_2$". In response to the instruction, the second data updating unit 601 updates the second database 116 of the second identification data system.

FIG. 21 shows the updated content of the second database 116. As compared to the content shown in FIG. 20, it is obviously understood that the EPCs "$A_{2-1}$" and "$A_{2-2}$" are added in correspondence with the bar code data "$B_2$". As mentioned above, the process of mutually relating an EPC and bar code data with each other is completed.

Data Acquisition

An explanation will now be described with respect to a case where the user transmits a request to check time at which a product with bar code data "$B_1$" passed through the factory 102, using the product data terminal 118C. When receiving the request from the product data terminal 118C, the data acquiring unit 128C calls the second data providing program using the bar code data "$B_1$" and a data item "FACTORY" as arguments, thus activating the second data providing unit 127C. The second data providing unit 127C retrieves the bar code data "$B_1$" and data of the data item "FACTORY" from the second database 116 of the second identification data system.

FIG. 20 shows the second database 116. The second database 116 includes the bar code data "$B_1$" but does not include the data item "FACTORY". Therefore, the EPCs "$A_{1-1}$", "$A_{1-2}$", and "$A_{1-3}$" corresponding to the bar code data "$B_1$" are acquired and are then returned to the data acquiring unit 128C.

The data acquiring unit 128C determines that the acquired data is not data of the requested data item "FACTORY" and the data is data of the other ID data system, i.e., data of the data item "EPC". Consequently, to refer to the first database 115 of the first identification data system in which data related with EPCs are stored, the first data providing program is called using the EPCs "$A_{1-1}$", "$A_{1-2}$", and "$A_{1-3}$" and the data item "FACTORY" as arguments, thus activating the first data providing unit 126C. To acquire data of the data item "FACTORY" corresponding to the EPCs "$A_{1-1}$", "$A_{1-2}$", and "$A_{1-3}$", the first data providing unit 126C refers to the first database 115 of the first identification data system shown in FIG. 8. Data concerned with the data item "FACTORY", each of which the EPCs "$A_{1-1}$", "$A_{1-2}$", and "$A_{1-3}$" correspond to, indicates "2003/10/2 13:24" as passage time. The data indicating "2003/10/2 13:24" as the data item "FACTORY" corresponding to each of the EPCs "$A_{1-1}$", "$A_{1-2}$", and "$A_{1-3}$" is returned to the data acquiring unit 128C.

The data acquiring unit 128C notifies the product data terminal 118C that three products corresponding to the bar code data "B$_1$" passed through the factory 102 at "2003/1012 13:24", i.e., they were shipped from the factory 102 at that time. When receiving the notification, the product data terminal 118C permits the display to display the fact.

According to the first, second, and fourth embodiments as mentioned above, the product data terminal is used as a user terminal. The terminal is not limited to the product data terminal. For example, general user terminals can also be used as described in the third embodiment. In FIG. 1, the data management device 114 is connected to the input data terminal 111 via the communication network 101. The data management device 114 may also function as the input data terminal 111. For the in-store processor 117, similarly, the in-store processor 117 may also function as the data management device 114 or the input data terminal 111. It is essential only that various programs described in the above embodiments be executed in the system to manage two identification data systems mentioned above.

In the above embodiments, the input device capable of scanning a bar code and an RF tag as shown in FIG. 2 is used. The input device is not limited to this type. Two kinds of input devices can be used to separately input a bar code and an RF tag. Further, in inputting identification data of two identification data systems in correspondence with a product such that the identification data of the two identification data systems are related with each other, it is unnecessary to always add identification data of the two identification data systems to each product. Identification data of the two identification data systems can be input such that they are related with each other by any means.

In addition, in the above embodiments, bar code data and RF tag data have been described as identification data of two identification data systems. Obviously, the present invention can be applied to identification data of two identification data systems which are generally different from each other.

What is claimed is:

1. A product identification data management system comprising:
    identification data input means for inputting identification data of two data systems added to each product such that the identification data of one data system is related with that of the other data system for every product;
    a data management device, including a first database for storing the first identification data of the first data system and a second database for storing the second identification data of the second data system and a data updating unit for updating the databases according to the relation of the identification data of the two data systems; and
    database retrieval means for retrieving the identification data of one data system from the database and acquiring the identification data when identification data of the other data system is designated.

2. The system according to claim 1, wherein the database includes database segments such that identification data of each product is stored in correspondence with auxiliary data concerned with the product every data system.

3. The system according to claim 2, further comprising:
    database segment cooperative retrieval means for retrieving data, which does not exist in one database segment of one data system, from the other database segment of the other data system on the basis of identification data of the same product.

4. A product identification data management system comprising:
    relation mode reading means for reading identification data of two data systems correctly added to each product in order to identify the same product;
    relating means for relating the class fields of the identification data of the two data systems, read by the relation mode reading means, with each other every kind of product, the class field serving as a data segment to identify the kind of product;
    a data management device, including a first database for storing the first identification data of the first data system and a second database for storing the second identification data of the second data system, the class fields of the first identification data and the second identification data being related by the relating means, and a data updating unit for updating the databases according to the relation of the identification data of the two data systems; and
    database retrieval means for retrieving the identification data of one data system from the database and acquiring the identification data when the class field of the identification data of the other data system is designated.

5. A product identification data management system comprising:
    relation mode reading means for reading identification data of two data systems correctly added to each product in order to identify the same product;
    relating means for relating the class fields of the identification data of the two data systems, read by the relation mode reading means, with each other every kind of product, the class field serving as a data segment to identify the kind of product;
    a data management device, including a first database for storing the first identification data of the first data system and a second database for storing the second identification data of the second data system, the class fields of the first identification data and the second identification data being related by the relating means, and a data updating unit for updating the databases according to the relation of the identification data of the two data systems;
    check mode reading means for reading identification data of the two data systems added to the same product in order to check an unknown relation therebetween;
    check mode retrieval means for retrieving identification data of one data system, which is related with the identification data of the other data system read by the check mode reading means, from the database;
    identification data checking means for checking whether the identification data retrieved by the check mode retrieval means is identical to the identification data with the related class field read by the check mode reading means; and
    relation determination means for determining that the identification data of the two data systems with the unknown relation therebetween added to the product, read by the check mode reading means, are related with each other as identification data of the same product when the identification data checking means obtains the consistency of both the identification data, and for determining that the identification data of the two data systems are not related with each other as identification data of the same product in other cases.

6. The system according to claim 5, further comprising mode switching means for switching the operation mode between the relation mode and the check mode.

7. A product identification data management method comprising:
- an identification data input step of inputting identification data of two data systems added to each product such that the identification data of one data system is related with that of the other data system for every product;
- a database construction step of storing the identification data of the first data system inputted in the identification data input step in a first data base and storing the identification data of second data system inputted in the identification data input step in a second data base;
- a data updating step of updating the databases according to the relation of the identification data of the two data system; and
- a database retrieval step of retrieving the identification data of one data system from the database and acquiring the identification data when the identification data of the other data system is designated.

8. A product identification data management method comprising:
- a relation mode reading step of reading identification data of two data systems correctly added to each product in order to identify the same product;
- a relating step of relating the class fields of the identification data of the two data systems, read in the relation mode reading step, with each other every kind of product, the class field serving as a data segment to identify the kind of product;
- a database construction step of storing the identification data of the first data system inputted in the identification data input step in a first data base and storing the identification data of second data system inputted in the identification data input step in a second data base, the class fields of the first identification data and the second identification data being related in the relating step;
- a data updating step of updating the databases according to the relation of the identification data of the two data system; and
- a database retrieval step of retrieving the identification data of one data system from the database and acquiring the identification data when the class field of the identification data of the other data system is designated.

9. A product identification data management method comprising:
- a relation mode reading step of reading identification data of two data systems correctly added to each product in order to identify the same product;
- a relating means for relating the class fields of the identification data of the two data systems, read in the relation mode reading step, with each other every kind of product, the class field serving as a data segment to identify the kind of product;
- a database construction step of storing the identification data of the first data system inputted in the identification data input step in a first data base and storing the identification data of second data system inputted in the identification data input step in a second data base, the class fields of the first identification data and the second identification data being related in the relating step;
- a data updating step of updating the databases according to the relation of the identification data of the two data system;
- a check mode reading step of reading identification data of the two data systems added to the same product in order to check an unknown relation therebetween;
- a check mode retrieval step of retrieving identification data of one data system, which is related with the identification data of the other data system read in the check mode reading step, from the database;
- an identification data checking step of checking whether the identification data retrieved in the check mode retrieval step is identical to the identification data with the related class field read in the check mode reading step; and
- a relation determination step of determining that the identification data of the two data systems with the unknown relation therebetween added to the product, read in the check mode reading step, are related with each other as identification data of the same product when the consistency of both the identification data is obtained in the identification data checking step, and of determining that the identification data of the two data systems are not related with each other as identification data of the same product in other cases.

10. The method according to claim 9, further comprising a mode switching step of switching the operation mode between the relation mode and the check mode.

11. A product identification data management system comprising:
- a first computer-readable recording medium for recording first identification data, the first recording medium being attached to each product to be managed;
- a second computer-readable recording medium for recording second identification data having a data system independent of that of the first identification data, the second recording medium being attached to each product together with the first recording medium;
- a first storage device for storing the first identification data and a second storage device for storing the second identification data such that the first identification data recorded in the first recording medium attached to the product is related with the second identification data recorded in the second recording medium attached to the same product;
- a data updating unit for updating the first and the second storage devices according to the relation of the identification data of the two data systems; and
- a processor for executing a process of retrieving data on the basis of input second identification data by using first identification data corresponding to the input second identification data.

12. The system according to claim 11, wherein the first recording medium includes a bar code printed matter and the second recording medium includes an RF tag.

13. A product identification data management system comprising:
- a first computer-readable recording medium for recording first identification data, the first recording medium being attached to each product to be managed;
- a second computer-readable recording medium for recording second identification data having a data system independent of that of the first identification data, the second recording medium being attached to each product together with the first recording medium;
- a first storage device for storing the first identification data and data recorded in connection with the first identification data;
- a second storage device for storing the first and second identification data such that the first identification data recorded in the first recording medium attached to the product is related with the second identification data recorded in the second recording medium attached to the same product;

a processor for executing a process of retrieving data on the basis of input second identification data by using first identification data corresponding to the input second identification data; and a third storage device for storing the second identification data and data recorded in connection with the second identification data.

14. A product identification data management system comprising:

- a first computer-readable recording medium for recording first identification data, the first recording medium being attached to each product to be managed;
- a second computer-readable recording medium for recording second identification data having a data system independent of that of the first identification data, the second recording medium being attached to each product together with the first recording medium;
- a first storage device for storing the first identification data and data recorded in connection with the first identification data;
- a second storage device for storing the first and second identification data such that the first identification data recorded in the first recording medium attached to the product is related with the second identification data recorded in the second recording medium attached to the same product;
- a processor for executing a process of retrieving data on the basis of input second identification data by using first identification data corresponding to the input second identification data;
- a third storage device for storing the second identification data and data recorded in connection with the second identification data; and
- a processor for executing a process of checking data stored in the first storage device against data stored in the third storage device on the basis of the relation stored in the second storage device.

* * * * *